May 7, 1946.  F. E. BACHMAN  2,399,846
SHOCK STRUT
Filed July 21, 1944
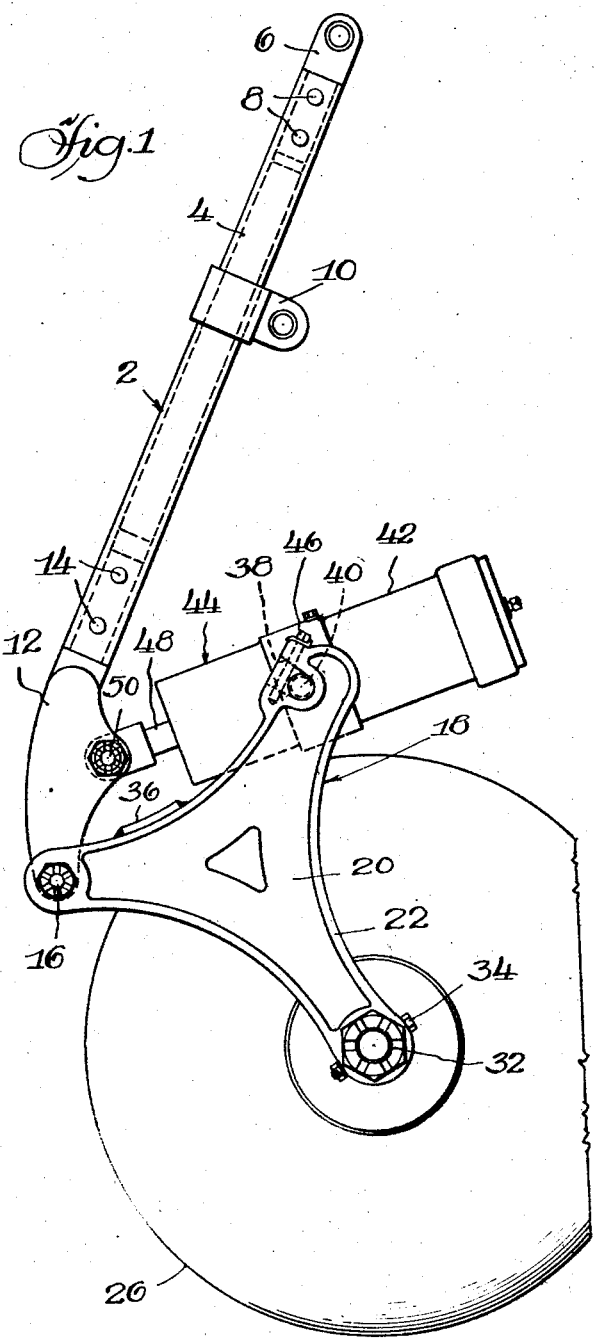
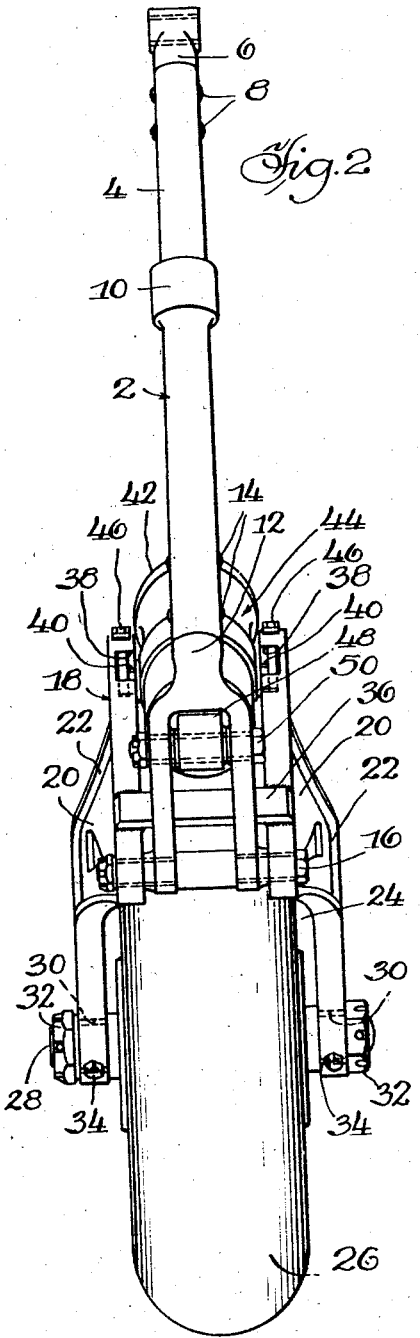
INVENTOR.
Fred E. Bachman
BY
Atty.

Patented May 7, 1946

2,399,846

UNITED STATES PATENT OFFICE 2,399,846

SHOCK STRUT

Fred E. Bachman, Chicago, Ill., assignor to American Steel Foundries, Chicago, Ill., a corporation of New Jersey Application July 21, 1944, Serial No. 545,933

4 Claims. (Cl. 244—104)

My invention relates to shock absorbing mechanisms and more particularly to a novel landing gear for an aircraft.

The general object of my invention is to design a landing gear wherein the wheel axle is connected to the aircraft in such manner as to eliminate cantilever bending stresses on said axle, as well as the shock absorber device forming a part of the gear.

Another object of my invention is to provide in a gear of the above-described type a novel connection between the wheel and the aircraft, whereby the wheel is dragged rather than pushed over the terrain, thus substantially eliminating shimmying of the wheel in what is commonly known as a caster arrangement.

A specific object of my invention is to accomplish the above objects by an arrangement wherein a fulcrum member is rigidly connected at opposite ends of the wheel axle and supports a shock absorber device above the wheel, a link or strut being pivotally connected to the fulcrum and one end of the shock absorber device for actuation of the latter as the gear is compressed and extended.

In the drawing, Figure 1 is a side elevation of a landing gear embodying my invention, and Figure 2 is a front elevation taken from the left as seen in Figure 1.

Describing my invention in detail, the link or strut generally designated 2 comprises a piece of hollow tubing 4 and a bracket 6 inserted in the upper extremity thereof for securement thereto in any convenient manner as by rivets 8, 8, said bracket being formed and arranged for connection in the conventional manner to an associated aircraft (not shown). A bracket 10 is secured in any convenient manner as by welding to the tube 4 intermediate the ends thereof, said bracket being formed and arranged for connection in usual manner to an associated retracter mechanism (not shown). A jaw 12 is secured to the lower end of the tube 4 as by means of spaced rivets 14, 14 which extend through a portion of the jaw received within the tube.

At its lower extremity the jaw 12 is pivotally connected by means of a bolt and nut assembly 16 to a fulcrum generally designated 18, said fulcrum comprising a pair of spaced plates 20, 20 each being flanged about the perimeter thereof as at 22 and being offset adjacent its lower extremity to define a jaw 24 (Figure 2) receiving the wheel 26 of the wheel and axle assembly.

The wheel and axle assembly comprises an axle 28 (Figure 2) extending through aligned openings 30, 30 in the lower ends of the plates 20, 20. Nuts 32, 32 are threaded on opposite ends of the axle and keys 34, 34 are provided for preventing rotation of the axle relative to the fulcrum 18. The plates 20, 20 are connected by means of a tie bar 36, secured thereto in any convenient manner, as by welding, adjacent the before-mentioned pivotal connection at 16 between the plates and the jaw 12 of the link 2.

At their upper extremities the margins of the plates 20, 20 are offset at 38, 38 respectively to define slots for the reception of the trunnions or pivot pins 40, 40 of the cylinder 42 forming a part of the shock absorber device generally designated 44, said trunnions being maintained within the associated slots by means of bolts 46, 46 which are spaced sufficiently from the trunnions to afford pivotal movement thereof relative to the fulcrum 18 as the landing gear is compressed or extended.

The shock absorber device 44 also includes a piston (not shown) reciprocal within the cylinder 42 and comprising a piston rod 48 pivotally connected at 50 by means of a bolt and nut assembly within the jaw 12 of the link 2. It will be readily understood by those skilled in the art that the shock absorber device 44 comprises any conventional means within the cylinder 42 for metering associated hydraulic fluid, such as oil, therewithin as the piston of the piston rod 48 reciprocates within the cylinder during expansion and contraction of the gear.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a landing gear for an aircraft, a wheel and axle assembly comprising a wheel and a non-rotatable axle, a fulcrum member comprising a pair of spaced plates and a tie bar extending between the same and fixed thereto, said plates receiving said wheel therebetween and having a rigid connection to said axle at opposite ends thereof, a shock absorber device above said wheel in vertical alignment therewith and extending between said plates, said device comprising two relatively movable elements, one of said elements having pivot means intermediate the ends thereof on opposite sides thereof pivotally connected to said plates, a link received between said plates forwardly of said wheel and having a pivotal connection at its lower extremity to said plates, and a pivotal connection between said link and the other element above said last-mentioned connection, the connections between said fulcrum member and said axle, link and device being on substantially parallel axes spaced a substantial distance from each other with the axes of the connections of said member to said link and said other element lying in horizontal planes between the axes of the connections of said member to said axle and said one element in the static condition of said gear, said link comprising pivot means at its upper end for connection to said aircraft.

2. In a landng gear for an aircraft, a wheel and axle assembly comprising a wheel and a non-rotatable axle, a fulcrum member comprising a pair of spaced plates and a tie bar extending between the same and fixed thereto, said plates receiving said wheel therebetween and having a rigid connection to said axle at opposite ends thereof, a shock absorber device above said wheel in vertical alignment therewith and extending between said plates, said device comprising two relatively movable elements, one of said elements having pivot means intermediate the ends thereof on opposite sides thereof pivotally connected to said plates, a link received between said plates forwardly of said wheel and having a pivotal connection at its lower extremity to said plates, and a pivotal connection between said link and the other element above said last-mentioned connection, the connections between said fulcrum member and said axle, link and device being on substantially parallel axes spaced a substantial distance from each other, the axes of said pivotal connections lying spaced from but closely adjacent the periphery of said wheel to permit rotation of said shock absorber about said wheel as the gear is compressed or extended, said link comprising pivot means at its upper end for connection to said aircraft.

3. In a landing gear for an aircraft, a wheel and axle assembly comprising a wheel and a non-rotatable axle, a fulcrum member comprising a pair of spaced plates receiving said wheel therebetween and having a rigid connection to said axle at opposite ends thereof, a shock absorber device comprising a cylinder between said plates and pivotally fulcrumed thereto above said wheel, a link extending between said plates and pivotally connected at its lower extremity thereto forwardly of said wheel, a piston reciprocal within said cylinder and comprising a piston rod pivotally connected to said link intermediate the ends thereof, the connections between said plates and said axle, link and cylinder being on substantially parallel axes spaced a substantial distance from each other with the axes of the connections of said link to said plates and said piston rod lying in horizontal planes between the axes of the connections of said plates to said axle and said cylinder in the static condition of said gear, said link comprising pivot means at the upper end thereof for connection to said aircraft.

4. In a landing gear for an aircraft, a wheel and axle assembly comprising a wheel and a non-rotatable axle, a fulcrum member comprising a pair of spaced plates receiving said wheel therebetween and having a rigid connection to said axle at opposite ends thereof, a shock absorber device comprising a cylinder between said plates and pivotally fulcrumed thereto above said wheel, a link extending between said plates and pivotally connected at its lower extremity thereto forwardly of said wheel, a piston reciprocal within said cylinder and comprising a piston rod pivotally connected to said link intermediate the ends thereof, the connections between said plates and said axle, link and cylinder being on substantially parallel axes spaced a substantial distance from each other, the axes of said pivotal connections lying spaced from but closely adjacent the periphery of said wheel to permit rotation of said shock absorber about said wheel as the gear is compressed or extended, said link comprising pivot means at the upper end thereof for connection to said aircraft.

FRED E. BACHMAN.